US008226098B2

(12) United States Patent
VanDenberg et al.

(10) Patent No.: US 8,226,098 B2
(45) Date of Patent: Jul. 24, 2012

(54) SUSPENSION SYSTEM WITH A RETROFIT SUSPENSION KIT

(75) Inventors: Ervin K. VanDenberg, Massillon, OH (US); David H. Croston, Navarre, OH (US)

(73) Assignee: Air Suspensions, Inc., Massillon, OH (US)

( * ) Notice: Subject to any disclaimer, the term of this patent is extended or adjusted under 35 U.S.C. 154(b) by 254 days.

(21) Appl. No.: 12/723,895

(22) Filed: Mar. 15, 2010

(65) Prior Publication Data
US 2010/0270769 A1    Oct. 28, 2010

Related U.S. Application Data

(60) Provisional application No. 61/171,618, filed on Apr. 22, 2009.

(51) Int. Cl.
*B60G 21/05* (2006.01)

(52) U.S. Cl. ... 280/124.106; 280/124.116; 280/124.128; 301/124.1

(58) Field of Classification Search ........... 280/124.106, 280/124.128, 124.153, 124.116; 301/124.1, 301/125
See application file for complete search history.

(56) References Cited

U.S. PATENT DOCUMENTS

| | | | |
|---|---|---|---|
| 3,784,221 A * | 1/1974 | Frasier, Sr. .................. | 280/86.5 |
| 4,171,830 A * | 10/1979 | Metz .......................... | 280/86.5 |
| 4,506,910 A | 3/1985 | Bierens | |
| 4,614,247 A * | 9/1986 | Sullivan ..................... | 180/24.02 |
| 4,889,361 A | 12/1989 | Booher | |
| 4,893,832 A | 1/1990 | Booher | |
| 5,163,701 A * | 11/1992 | Cromley, Jr. ............. | 280/124.13 |
| 5,277,450 A * | 1/1994 | Henschen ................. | 280/6.151 |
| 5,366,237 A | 11/1994 | Dilling et al. | |
| 5,427,404 A * | 6/1995 | Stephens ............... | 280/124.162 |
| 5,505,481 A | 4/1996 | Vandenberg et al. | |
| 5,505,482 A | 4/1996 | Vandenberg | |
| 5,540,454 A * | 7/1996 | VanDenberg et al. ....... | 280/81.1 |
| 5,683,098 A | 11/1997 | Vandenberg | |
| 5,690,353 A | 11/1997 | Vandenberg | |
| 5,718,445 A * | 2/1998 | VanDenberg ................ | 280/676 |
| 5,788,263 A | 8/1998 | Vandenberg | |
| 5,820,156 A | 10/1998 | Vandenberg | |
| 5,853,183 A | 12/1998 | Vandenberg | |
| 6,340,165 B1 * | 1/2002 | Kelderman ............ | 280/124.153 |
| 7,416,200 B2 * | 8/2008 | Hass et al. ............. | 280/124.116 |
| 7,516,821 B2 * | 4/2009 | Powers ........................ | 188/18 A |
| 7,980,577 B2 * | 7/2011 | Vandenberg et al. .. | 280/124.128 |

* cited by examiner

*Primary Examiner* — Toan To
(74) *Attorney, Agent, or Firm* — Sand & Sebolt

(57) ABSTRACT

The suspension system of the present invention broadly comprises a method of retrofitting an existing torsion axle suspension carried by a frame with an air spring comprising the steps of removing an original torsion axle that was fixed to a frame from the frame and mounting the torsion axle to at least one rotatable arm such that rotation of the arm causes vertical translation of the original torsion axle. The suspension system also comprises a retrofit kit for use with a torsion axle suspension system having a torsion axle and a spindle comprising a hanger bracket adapted to be attachable to the frame, a pivot arm for mounting to the hanger bracket and adapted for rotatably supporting the existing torsion axle, an air spring, a support assembly secured to the pivot arm for supporting the air spring, and an attachment for securing the pivot arm to the support assembly.

11 Claims, 12 Drawing Sheets

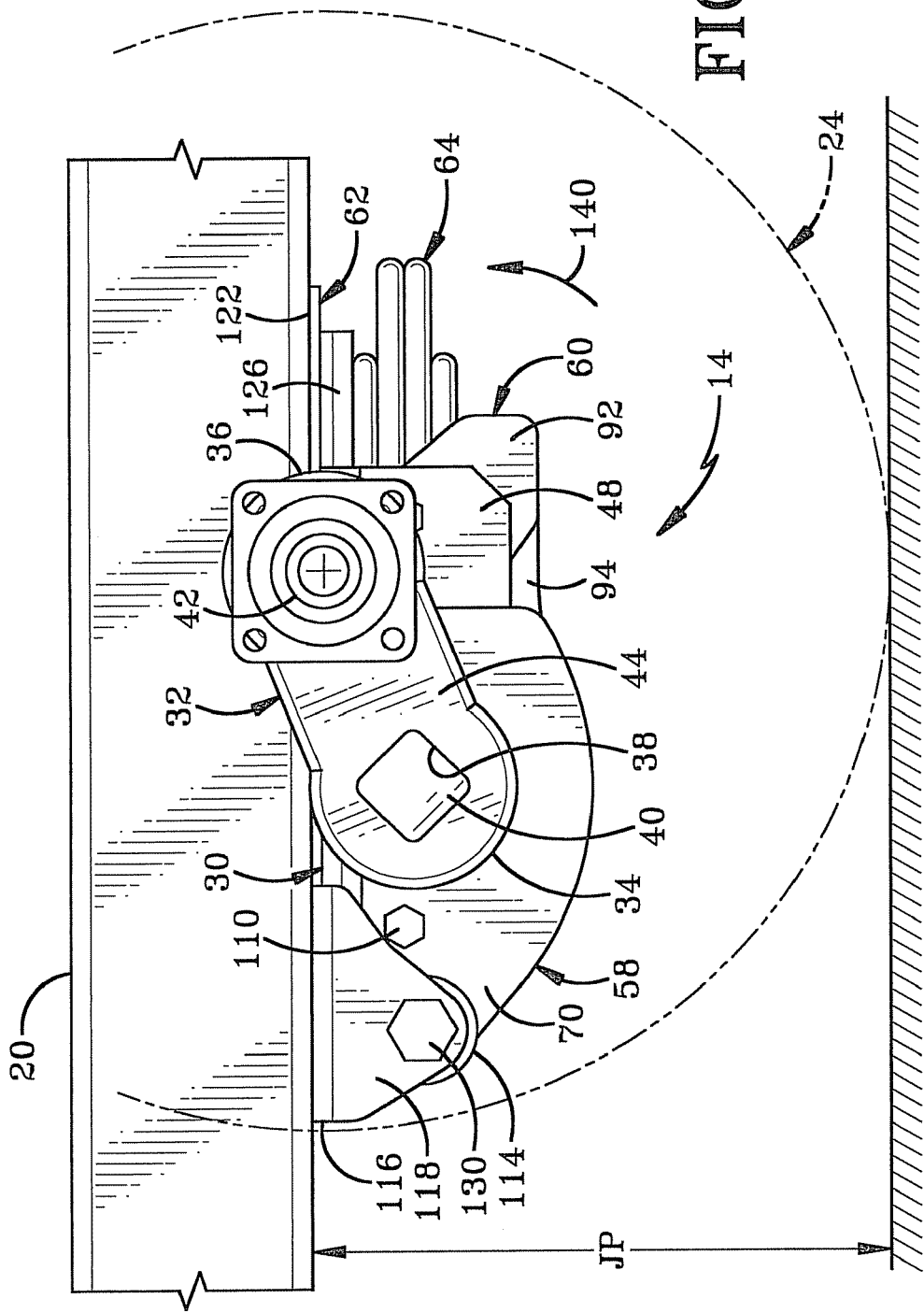

SUSPENSION SYSTEM WITH A RETROFIT SUSPENSION KIT

CROSS REFERENCE TO RELATED APPLICATION

This application claims priority from U.S. Provisional Patent application Ser. No. 61/171,618 filed Apr. 22, 2009; the disclosure of which is incorporated herein by reference.

BACKGROUND OF THE INVENTION

1. Technical Field

The invention relates generally to an improved vehicle suspension system for vehicles, such as trailers and trucks. More particularly, the invention relates to a retrofit kit for a torsion arm suspension. Specifically, the invention relates to a retrofit kit which can easily be installed on a torsion arm suspension so that the system provides both spring and torsion arm dampening without the additional expense of replacing the torsion arm suspension.

2. Background Information

Torsion axles have been known for many years, such as shown in U.S. Pat. No. 2,998,981. Torsion axles have proven to be extremely popular because if one wheel hits a bump or rut, it can react independently of the other wheel, which may not hit a bump or rut at the same time. This torsion axle concept operates to keep a trailer moving as straight as possible behind a towing vehicle and absorbs some of the shock of the road over which it is passing with an independent rut or is slowed down for any reason while the other wheel of the trailer does not have the same experience at the same time, the trailer would tend to turn somewhat to allow the wheel that is on the flat part of the road to move forward while the wheel that is in the rut is restrained, therefore causing the axle not to be perpendicular with the direction of towing of the vehicle itself.

Most torsion axles are constructed of a square axle in cross section with elongated rubber members disposed in-between the square axle and a larger outer tube. U.S. Pat. Nos. 5,161,814 and 5,820,156 discloses such a construction. One common torsion axle is a TorFlex® rubber torsion suspension system distributed by Dexter Axle. This type of torsion axle has independent and separate stub axles or stub shafts on each end which are part of spaced suspension assemblies mounting each of the wheels on the trailer frame to enhance the independent aspect of such an axle.

Torsion axles can also be constructed as in U.S. Pat. No. 5,163,701 which uses a plurality of elongated bars which can twist and bend but return to their original position after such bending. It is also known to use air bags, commonly referred to as air springs, for straight, non-torsion axles, such as shown in U.S. Pat. Nos. 3,784,221 and 5,427,404. While it is true that both the torsion axle technology and the air spring technology has been quite successful independently in making a smoother ride and enhanced the handling performances of vehicles having such suspension systems, these suspension systems still have their shortcomings and there is a need for improvement thereto.

The vehicle suspension system of U.S. Pat. No. 6,340,165 combines the advantage of both the torsion axle and air spring into a single suspension assembly and has provided a more efficient and better performing suspension system than that believed provided by the systems using only a torsion axle or only an air spring. Nevertheless, the combination system requires great expense and a significant amount of space. Further, the consumer is forced to decide at the outset whether to spend the extra money and purchase the combination suspension or purchase only one of the two suspensions.

Therefore, a need exists for a compact, cost-efficient, and simple retrofit kit for a suspension which allows the consumer to purchase components that can easily be connected to the existing suspension without modification.

SUMMARY OF THE INVENTION

The suspension system of the present invention broadly comprises a method of retrofitting an existing torsion axle suspension carried by a frame with an air spring comprising the steps of removing an original torsion axle that was fixed to a frame from the frame and mounting the torsion axle to at least one rotatable arm such that rotation of the arm causes vertical translation of the original torsion axle.

The present invention also broadly comprises a retrofit kit for use with a torsion axle suspension system having a torsion axle and a spindle comprising a hanger bracket adapted to be attachable to the frame, a pivot arm for mounting to the hanger bracket and adapted for rotatably supporting the existing torsion axle, an air spring, a support assembly secured to the pivot arm for supporting the air spring, and an attachment for securing the pivot arm to the support assembly.

BRIEF DESCRIPTION OF THE DRAWINGS

The preferred embodiment of the invention, illustrative of the best mode in which Applicant has contemplated applying the principles of the invention, is set forth in the following description and is shown in the drawings.

DESCRIPTION OF THE PREFERRED EMBODIMENT

At the outset, it should be appreciated that like drawing numbers on different drawing views identify identical, or functionally similar, structural elements of the invention. While the present invention is described with respect to what is presently considered to be the preferred embodiment, it is to be understood that the invention as claimed is not limited to the disclosed aspects.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
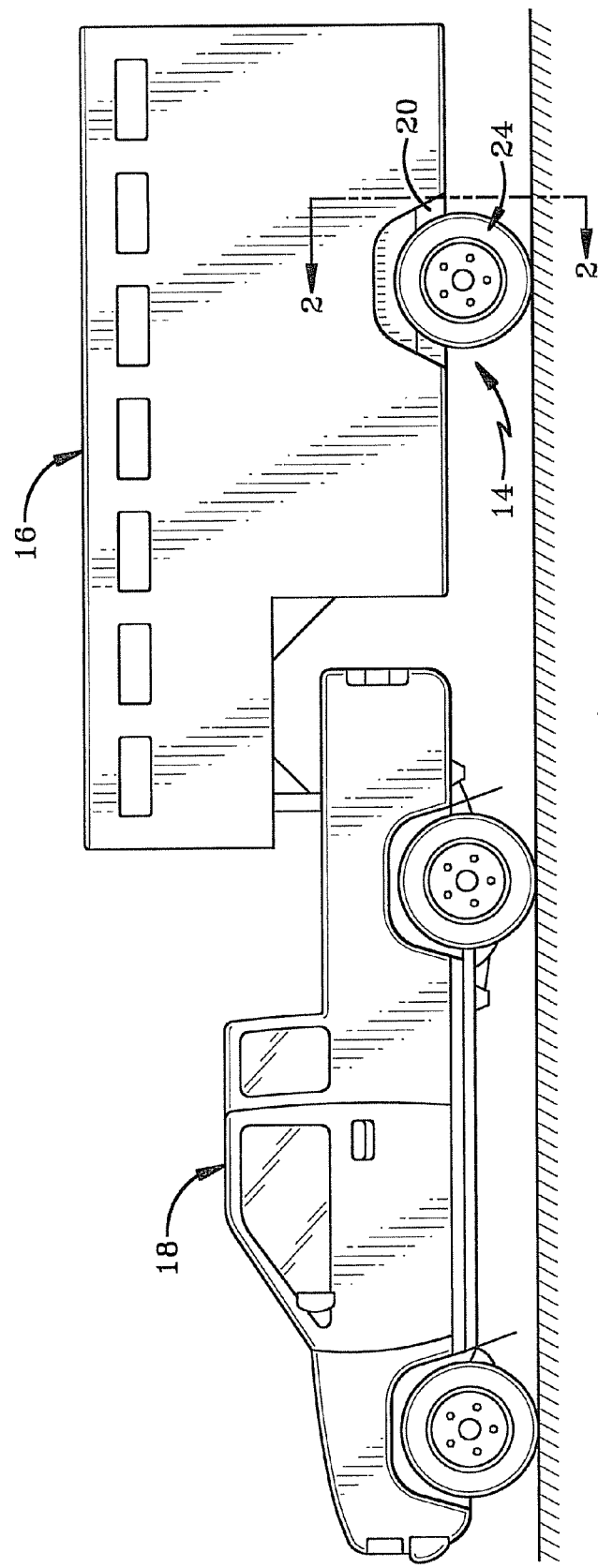
FIG. 1 is a left elevation view of a truck towing a trailer having a preferred embodiment suspension system retrofit kit.
Figure 2:
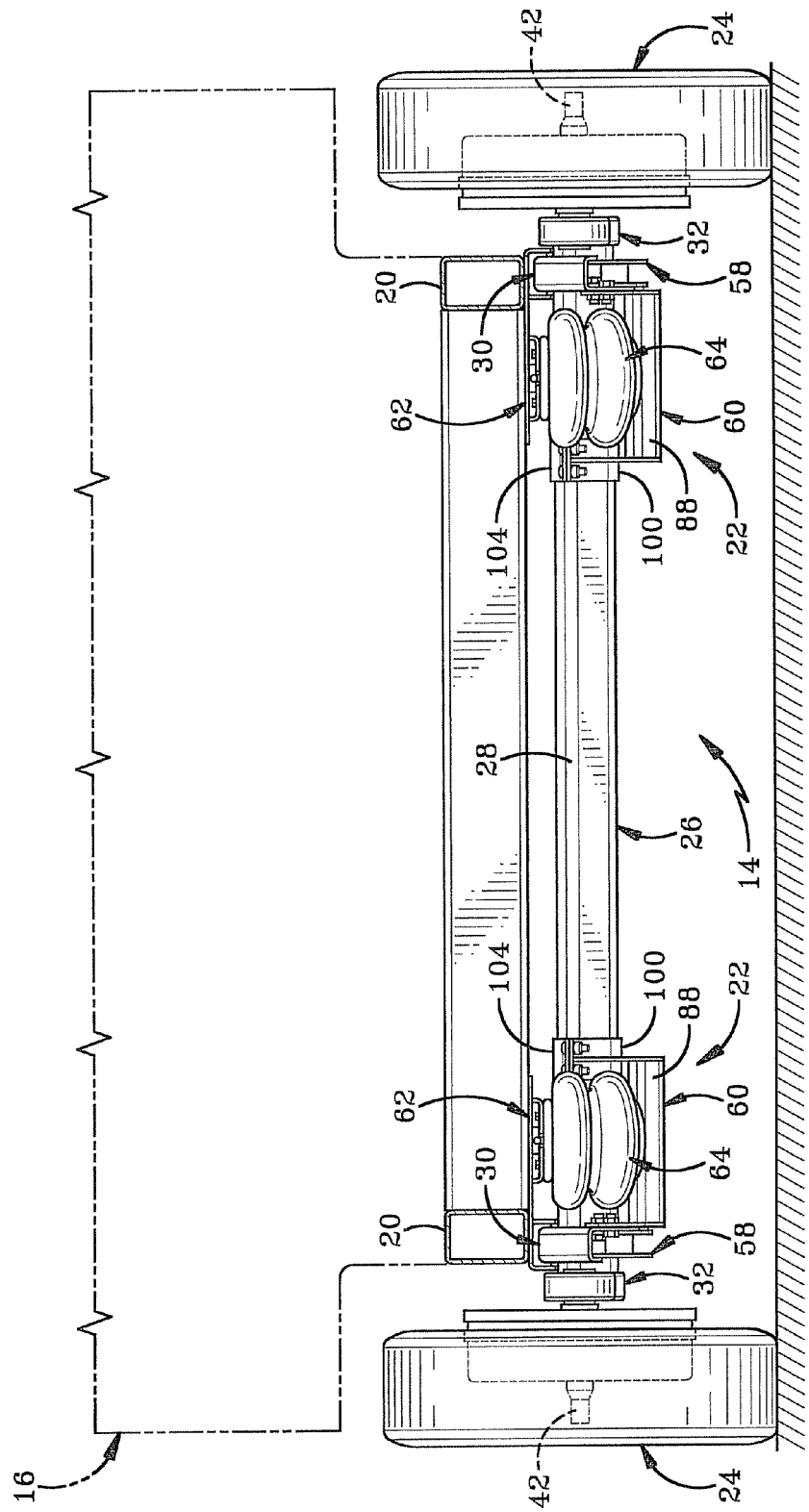
FIG. 2 is a rear elevation view of a retrofit suspension system of the preferred embodiment with a vehicle body attached to the frame and shown in dot-dash lines.

The vehicle suspension of the present invention is indicated generally at 14, as is particularly shown in FIGS. 1 through 12 mounted on a vehicle 16, such as a trailer of the type being towed by a truck 18. As seen in FIG. 2, trailer 16 is supported on a pair of frame rails 20 extending longitudinally along the length of the trailer. A pair of the retrofit kit suspension assemblies, each indicated generally at 22, are mounted on a respective frame rail 20, each generally adjacent a tire-wheel assembly 24.

Figure 3:
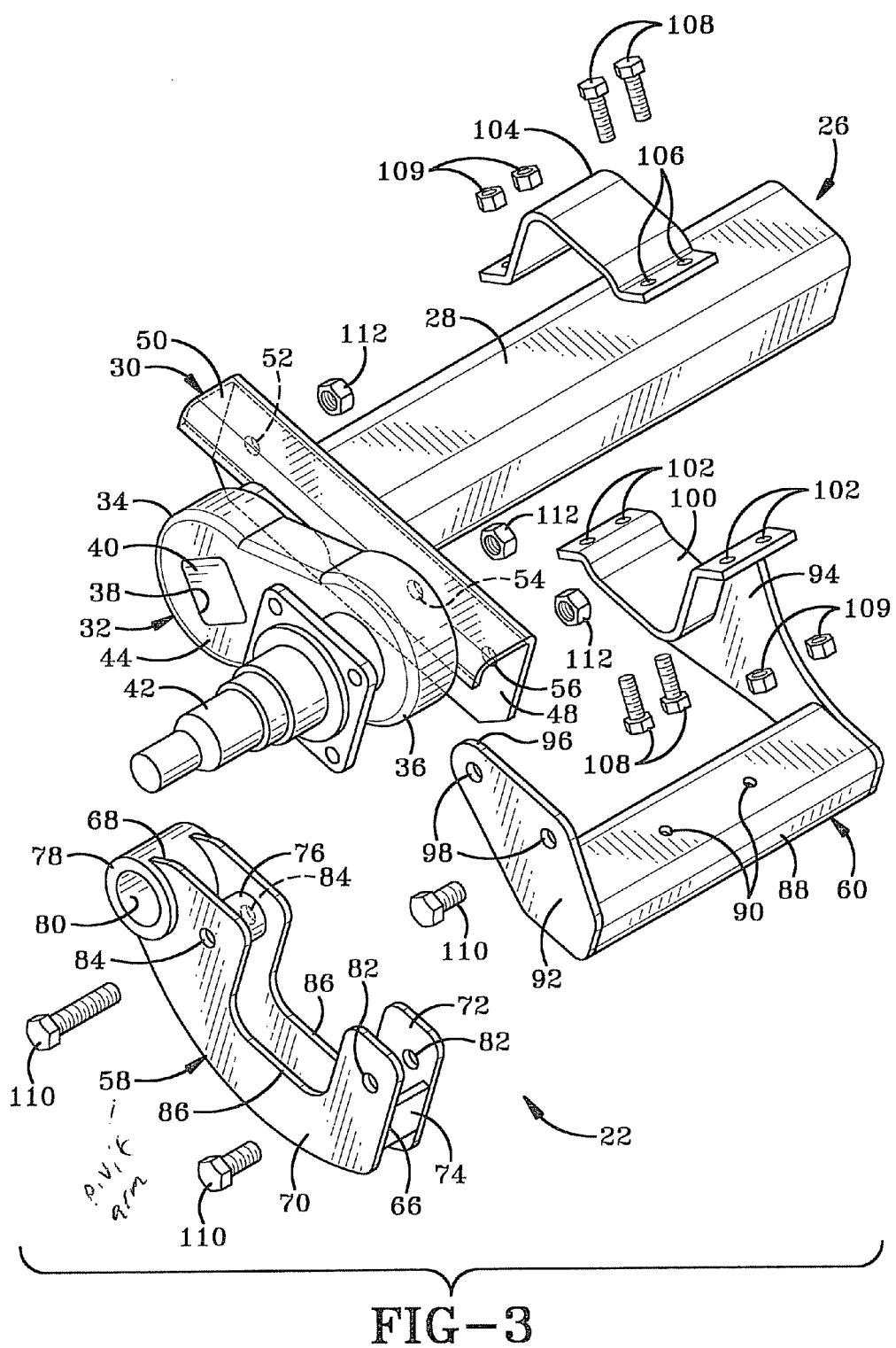
FIG. 3 is an exploded perspective view of the mounting hardware of the driver side of a preferred embodiment suspension system retrofit kit being assembled on a torsion arm suspension.
Figure 4:
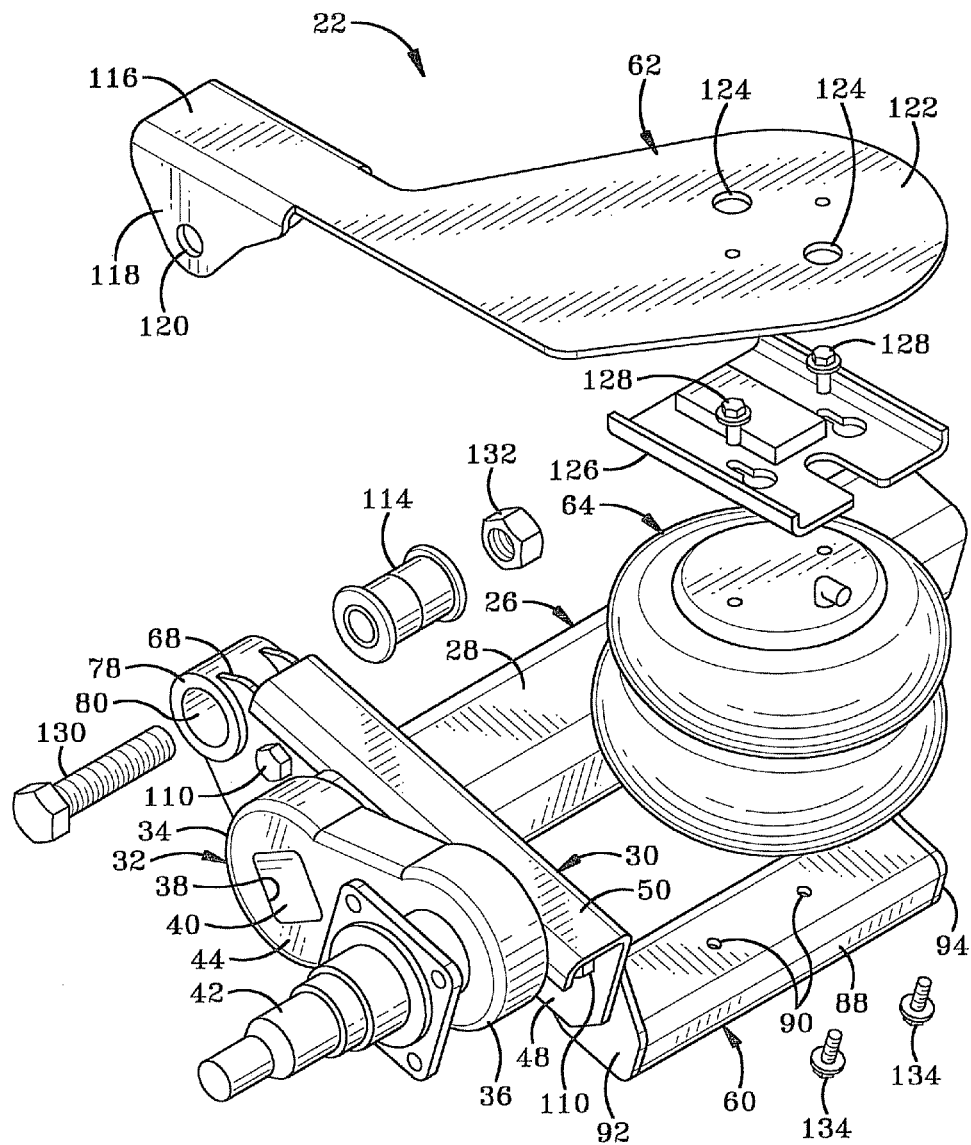
FIG. 4 is an exploded perspective view of a driver side of a preferred embodiment suspension system retrofit kit being assembled on a torsion arm suspension.

Averting to FIGS. 3 and 4, one of the retrofit suspension assemblies is shown in exploded views. Initially, a torsion axle 26 is provided and attached to the trailer frame. It is to be understood that the retrofit kit is installed around the trailing beam, or any other suitable suspension system that is provided by the trailer manufacturer and that virtually no modification is necessary for the retrofit kit installation.

Torsion axle 26 typically includes an axle 28, a mounting bracket 30 on each side, and a torsion arm 32 on each end of axle 28. Each mounting bracket 30 is located at least partially around the axle and proximate torsion arm 32. The torsion arm includes a first end 34 and a second end 36 opposite the first end. The first end includes an aperture 38 adapted to receive a torsion bar 40, while the second end includes a spindle 42 extending perpendicular from torsion arm 32 in a direction away from axle 28. Torsion bar 40 extends concentrically and longitudinally through axle 28 and preferably terminates flush with an outer side 44 of each torsion arm 32. In an alternative embodiment, torsion bar 40 may be split into two bars so that each wheel operates independent of the other.

Figure 9:
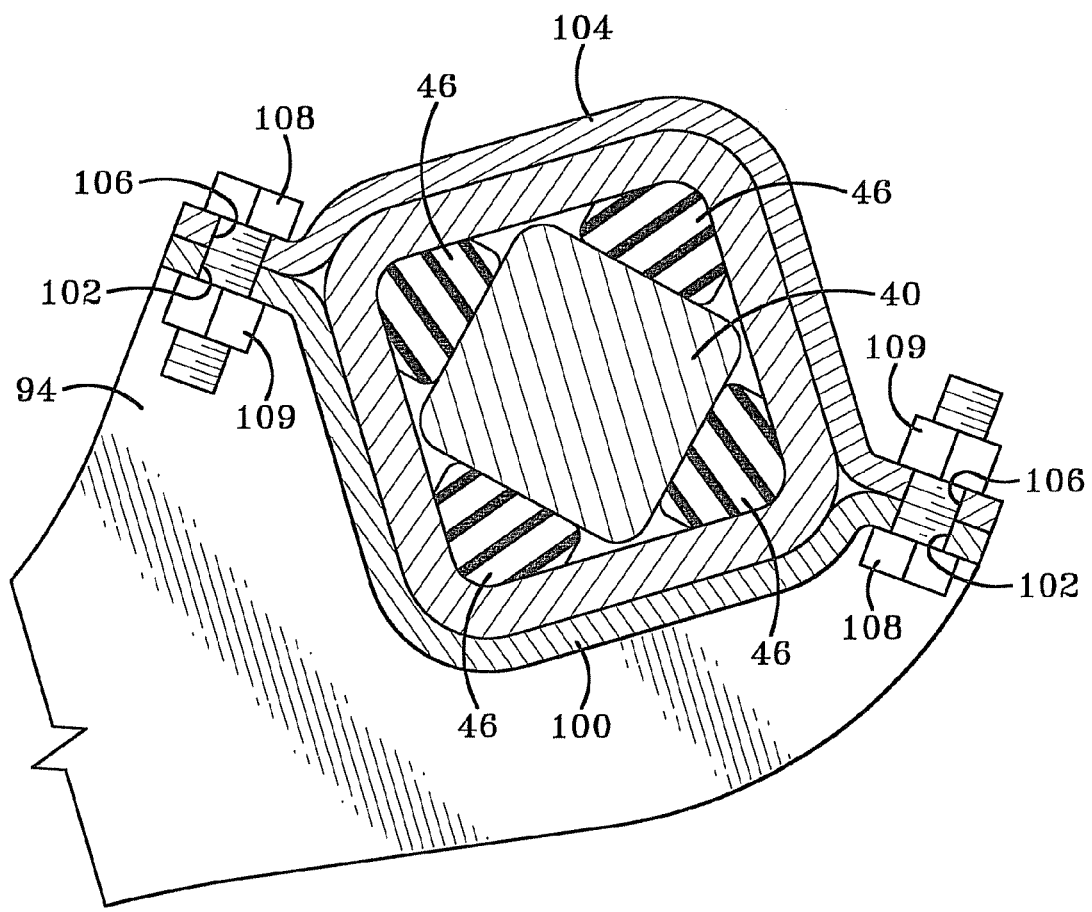
FIG. 9 is a cross-sectional view of the driver side of the preferred embodiment suspension system in FIG. 7 taken generally along line 9-9.

Further, torsion bar 40 is surrounded by rubber cords 46 longitudinally running the length of axle 28 as particularly seen in FIG. 9. In a preferred embodiment, four rubber cords are used and each is arranged along a flat side of torsion bar 40. Torsion bar 40 is preferably arranged asymmetrical to axle 28, so that flat sides of the torsion bar are directed at corners of the axle and corners of the torsion bar are directed at flat sides of the axle.

In a preferred embodiment, mounting bracket 30 includes vertical wall 48 and horizontal wall 50. Frame rails 20 are attached to horizontal wall 50, while vertical wall 48 includes through holes 52, 54, and 56 for attachment of the retrofit suspension. If through holes 52, 54, and 56 are not included in the mounting bracket from the trailer manufacturer, they will need to be drilled by the retrofit kit consumer before installation.

In accordance with one of the main features of the present invention, suspension retrofit kit 22 includes a pivot arm 58, a support assembly 60, a hanger bracket 62, and a spring 64. Pivot arm 58 includes a front end 66 and a back end 68. In a preferred embodiment, the pivot arm includes two parallel walls 70 and 72 connected to one another with mounting tab 74 via welding at the front end. A guide sleeve 76 is welded near the back end and a bushing mount 78 is attached at the back end with a through bore 80 via welding. Although welding is the preferred method of attachment, any suitable attachment means known in the art may be utilized. At the front end, both parallel walls 70 and 72 include through holes 82 which are arranged coaxially with one another. The guide sleeve includes a through hole arranged coaxially with through holes 84 in the parallel walls. Parallel walls 70 and 72 each also include U-shaped channels 86 between through holes 82 and 84 which are complimentary sized and shaped to fit around axle 28.

Support assembly 60 includes a mounting surface 88 with through holes 90, an outer arm 92, and an inner arm 94. Mounting surface 88 preferably extends between the inner and outer arms, as well as locates the bottom side of spring 64. Outer arm 92 preferably extends upwardly and outwardly away from mounting surface 88 such that the mounting surface is spaced apart from a back end 96 of the outer arm. Further, outer arm 92 includes a pair of through holes 98 spaced apart and arranged to be concentric with through holes 54 and 56 of mounting bracket 30.

Inner arm 94 is arranged similar to outer arm 92 in that the inner arm also extends upwardly and outwardly away from the mounting surface in the same direction as the outer arm. However, inner arm 94 terminates in a cradle 100. The cradle is shaped complimentary to one-half of axle 28, so that the cradle fits securely around the axle. Cradle 100 also includes a plurality of mounting holes 102 disposed around the perimeter. On the opposite side of axle 28 is bracket 104. Bracket 104 is also shaped complimentary to axle 28 and also includes a plurality of mounting holes 106. Advantageously, when cradle 100 and bracket 104 are each located around axle 28, mounting holes 102 and 106 are aligned and arranged to receive bolts 108 with nuts 109 to secure the cradle and the bracket together around the axle.

Figure 8:
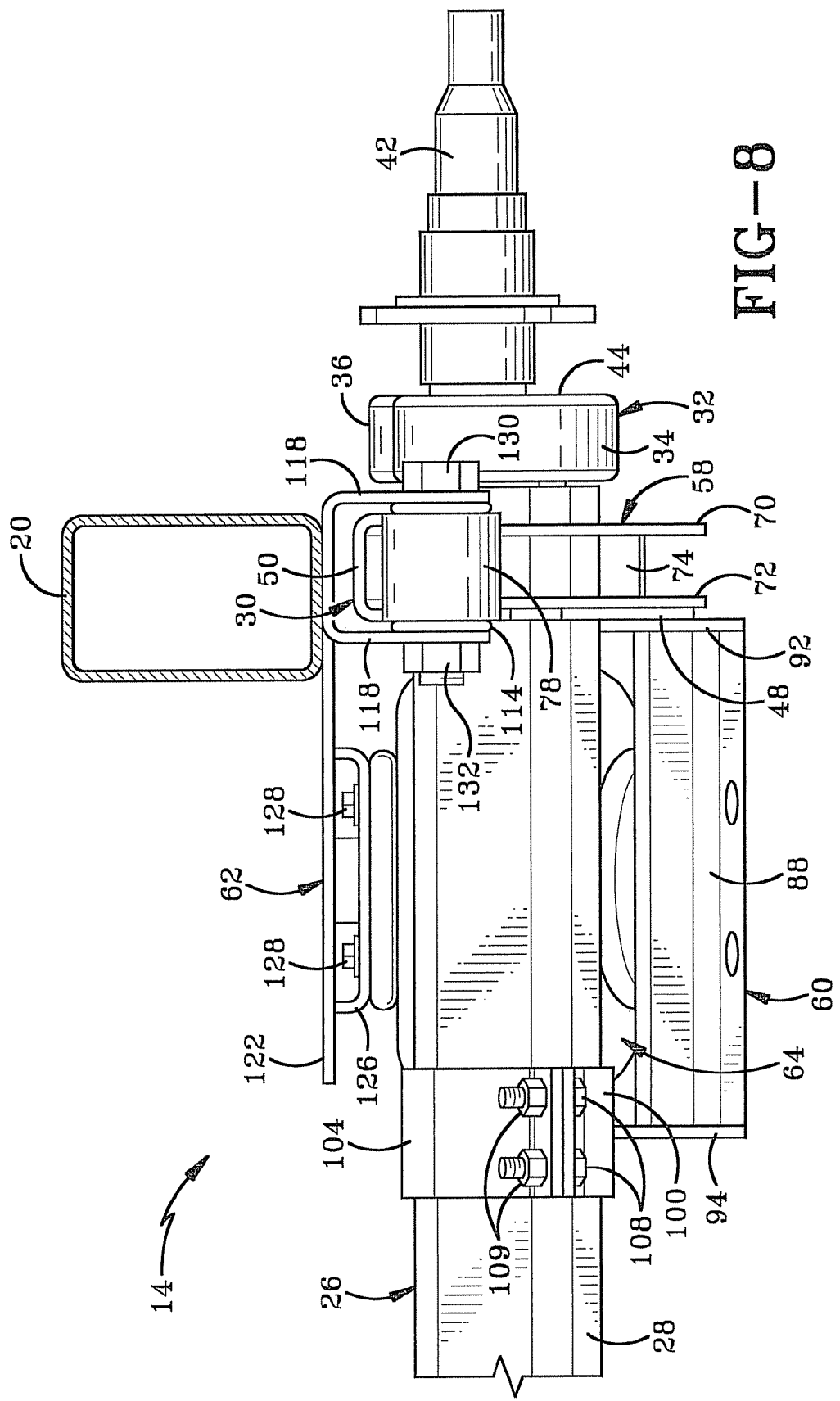
FIG. 8 is an enlarged front view of the driver side of a preferred embodiment suspension system retrofit kit installed.

In order to secure pivot arm 58 to mounting bracket 30, through holes 84 of the pivot arm are aligned with through holes 52 and 54 of the mounting bracket. Next, support assembly 60 is located so that through holes 98 are aligned with through holes 54 and 56. Accordingly, bolts 110 are inserted through the respective through holes and nuts 112 are threaded thereon (FIG. 8). Further, as discussed above, cradle 100 and bracket 104 are secured together around axle 28. Thus, the pivot arm and support assembly are secured both to each other and to torsion axle 26 at both mounting bracket 30 and axle 28.

As is particularly seen in FIG. 4, hanger bracket 62 and spring 64 are preferably installed next. Initially, through bore 80 of bushing mount 78 is arranged to receive a bushing 114, which is preferably a split-bushing where one-half of the bushing is inserted into each end of the through bore.

Figure 6:
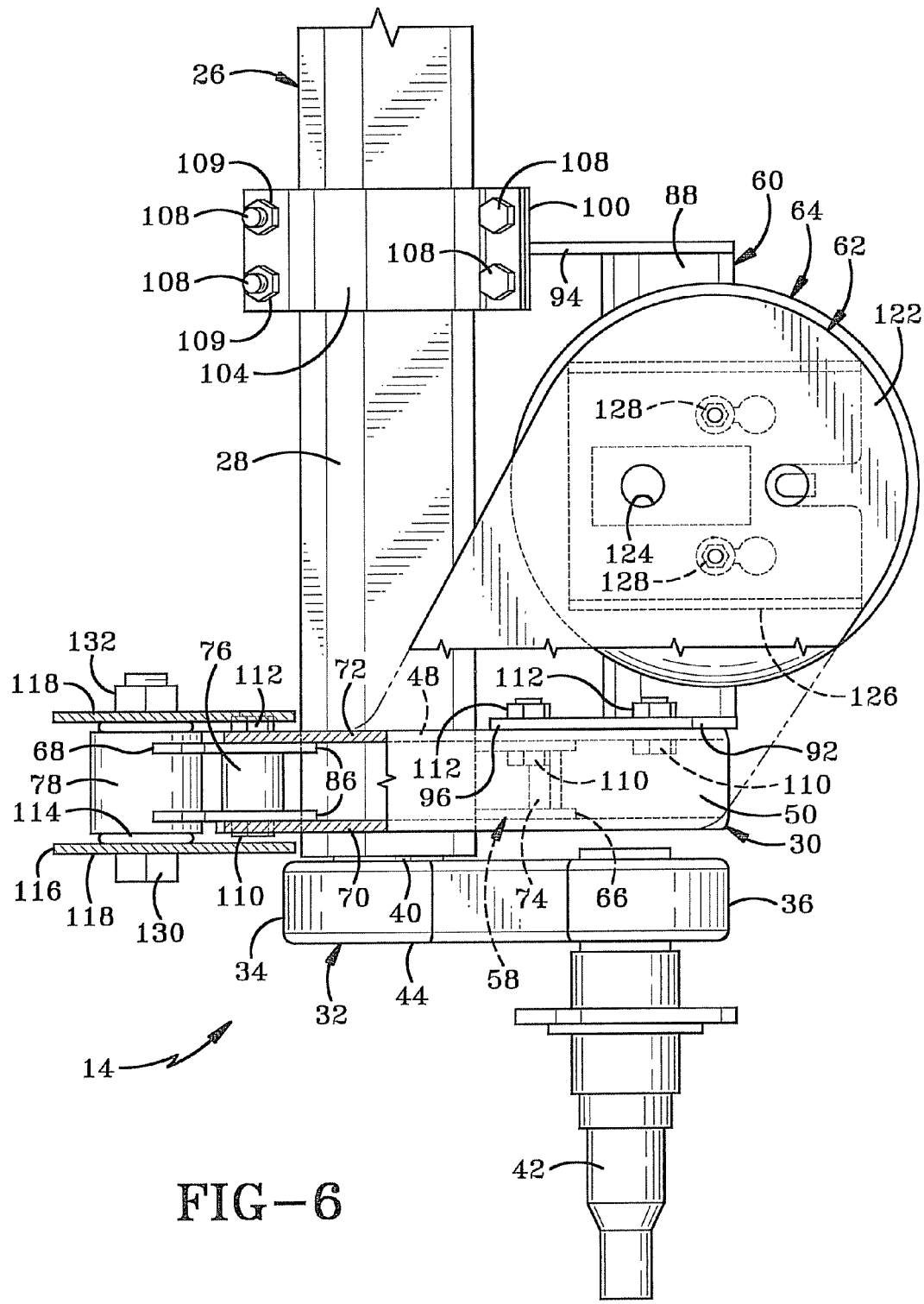
FIG. 6 is a bottom view of the driver side of a preferred embodiment suspension system retrofit kit installed.

As particularly seen in FIGS. 4 and 6, hanger bracket 62 includes a front end 116 that is slightly wider than guide sleeve 78 so that the front end can fit around the guide sleeve. Further, the front end has a pair of downwardly extending side walls 118 each having an opening 120 proximate the bottom of the side wall. The hanger bracket extends rearward from the front end and terminates at rear end 122. Rear end 122 includes apertures 124 to provides access to air lines and other components as necessary. A bottom side of the rear end is adapted to abut plate assembly 126 which is secured to the top of spring 64 with bolts or screws 128. Thus, movement of spring 64 translates into movement of rear end 122 of hanger bracket 62.

After the pivot arm and support assembly are secured, split bushing 114 is inserted into through bore 80. In the alternative, split bushing 114 could be factory installed and not require this step at this time. Next, hanger bracket 62 is installed around bushing mount 78 so that openings 120 are concentric with and on each side of through bore 80. A bolt 130 is then inserted through opening 120 and split bushing 114 and secured in place by threading a nut 132 onto the bolt. Thus, hanger bracket 62 can pivot about the connection at bushing 114. Next, spring 64, which is an air spring in the preferred embodiment, is located on mounting surface 88 of support assembly 60 and secured with bolts or screws 134. At the top of the air spring, bolts or screws 136 are preferably used to secure the plate assembly to spring 64. Thus, pivot arm 58 pivots at hanger bracket 62 the support assembly is moved upward or downward by spring 64. Further, this movement occurs because support assembly 60 is fixed in relation to mounting bracket 30 and pivot arm 58. Although in the preferred embodiment spring 64 is installed after hanger bracket 62, it is within the spirit and scope of the present invention as claimed to install the spring before the hanger bracket.

Figure 5:
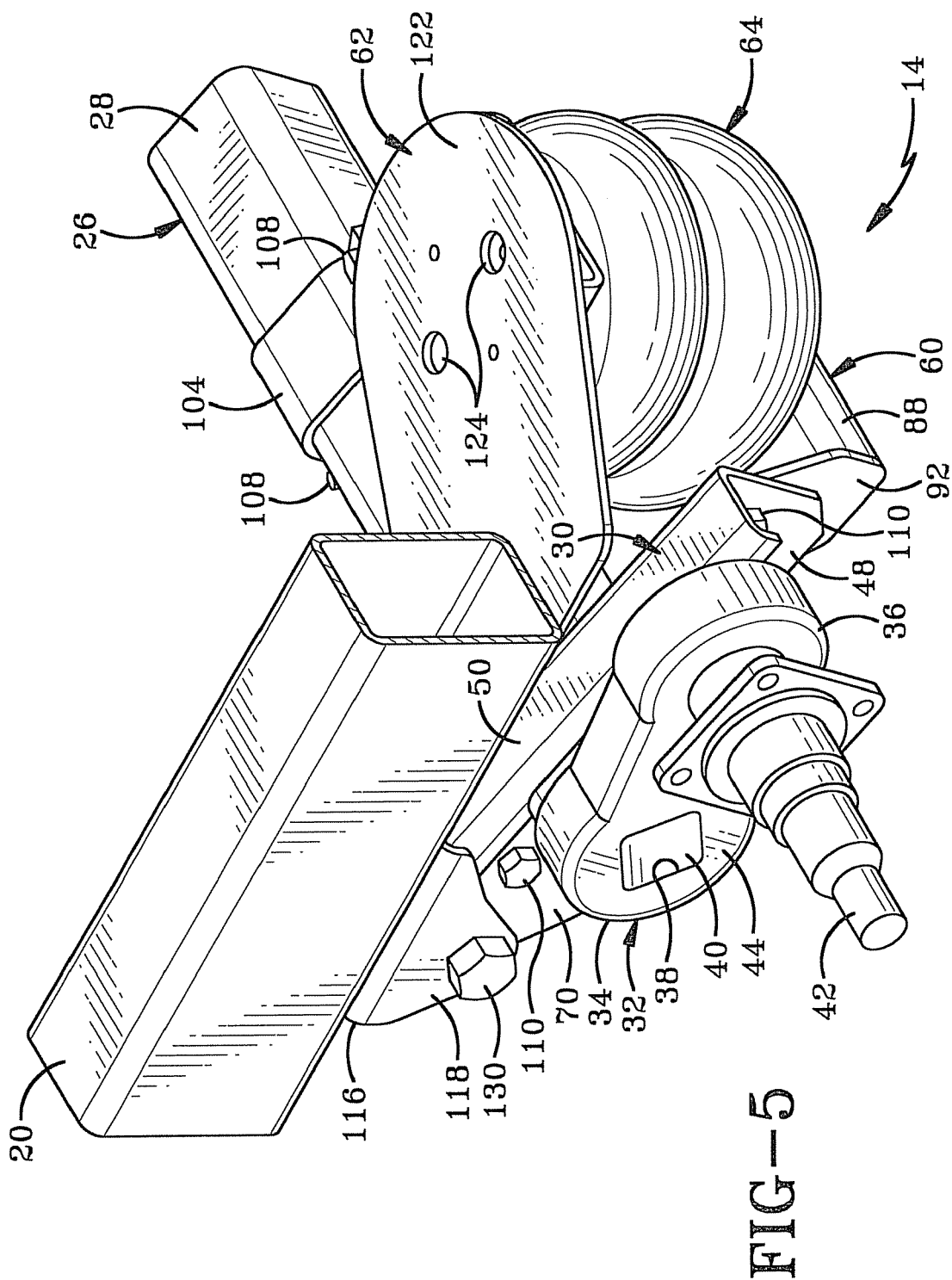
FIG. 5 is a perspective view of the driver side of a preferred embodiment suspension system retrofit kit assembled.

FIG. 5 illustrates the torsion axle suspension with the retrofit kit assembly installed and connected to frame rail 20. As can be seen, frame rail 20 only contacts the retrofit kit assembly at hanger bracket 62.

Figure 7:
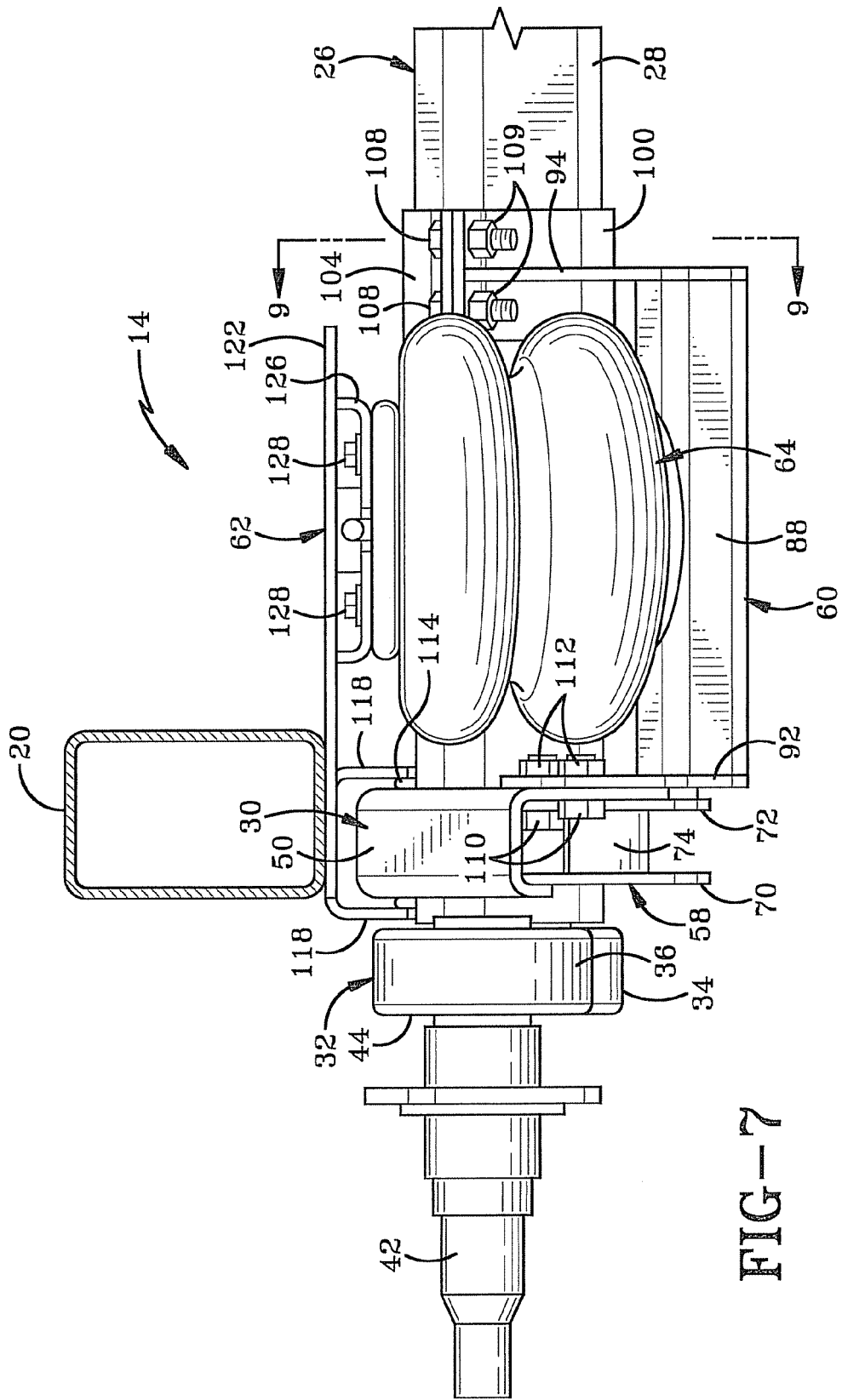
FIG. 7 is an enlarged rear view of the driver side of a preferred embodiment suspension system retrofit kit installed.

In accordance with another main feature of the invention, and particularly shown in FIG. 7, mounting bracket 30 is no longer directly connected to frame rail 20 after hanger bracket 62 is installed. Specifically, mounting bracket 30 is supported by support assembly 60 and pivot arm 58. Thus, mounting bracket 30 also moves with support assembly 60 and the torsion axle.

Having described the structure of the present invention, a preferred method of operation will be described in detail and should be read in light of FIGS. 1 through 12 and specifically FIGS. 10 through 12. The following preferred embodiment description utilizes a Dexter 8000 rubber torsion axle with a standard frame bracket, a 22.5 degree up swing arm angle, and the through bore 80 of pivot arm 58 located approximately 2.5 inches from the trailer frame, but is not limited to such and is only representative of potential system dimensions, which are limited only by the Claims.

Figure 10:
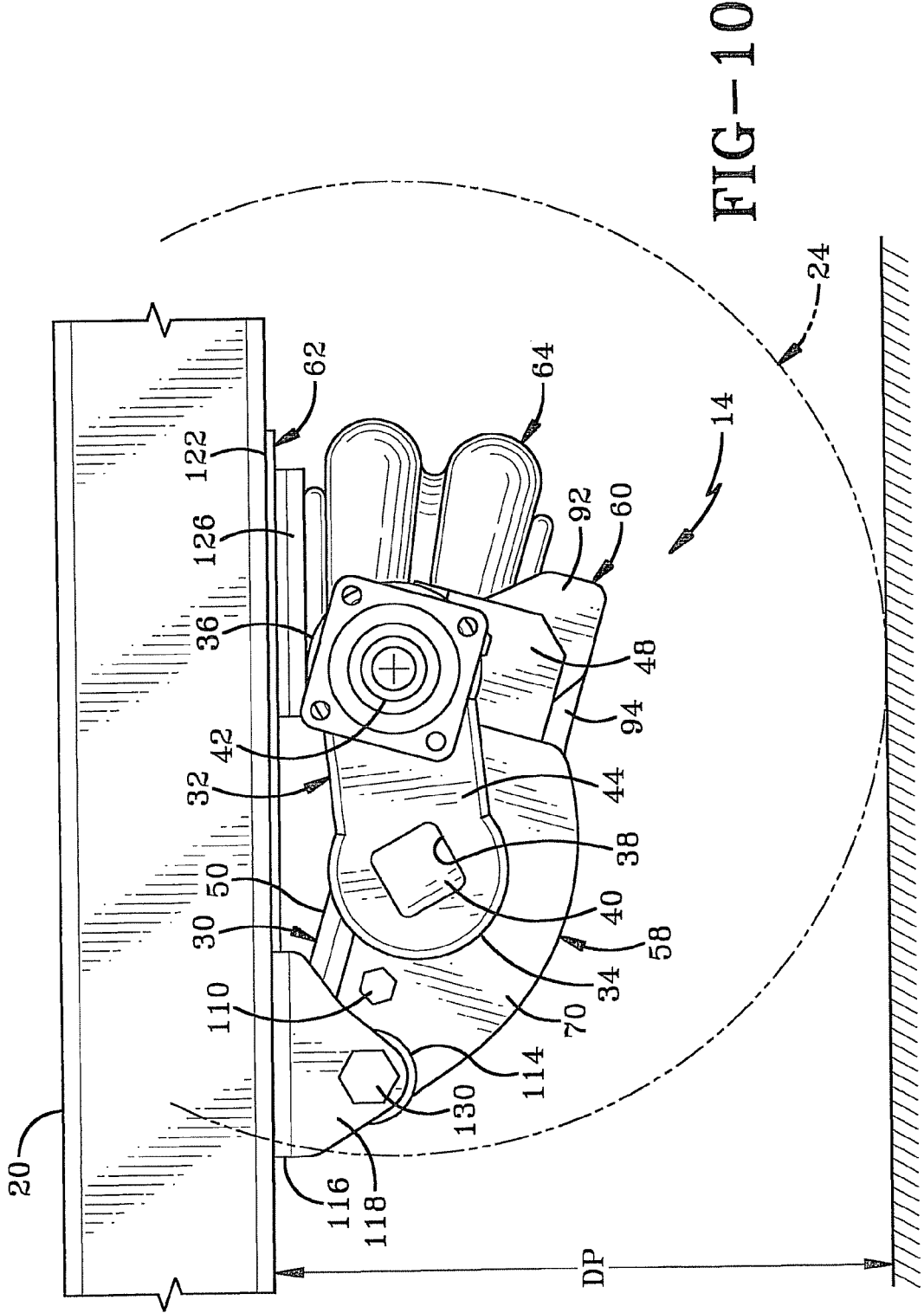
FIG. 10 is a left elevation view of the driver side of a preferred embodiment suspension system retrofit kit installed and in the design position.

FIG. 10 illustrates the vehicle suspension system in the design position and also represents the state of the suspension when traveling down a smooth road without undulations. The trailer will ride slightly higher with the retrofit suspension assembly when spring 64 is at the design position and the torsion axle is at full load. In a preferred embodiment, the ride height is approximately 3.11 inches and allows for approximately 3.78 inches of spindle jounce travel. However, the present invention is not limited to any particular ride height or spindle jounce travel as various size tire/wheel assemblies and desired suspension arrangements will require or allow for significantly different parameters.

Figure 11:
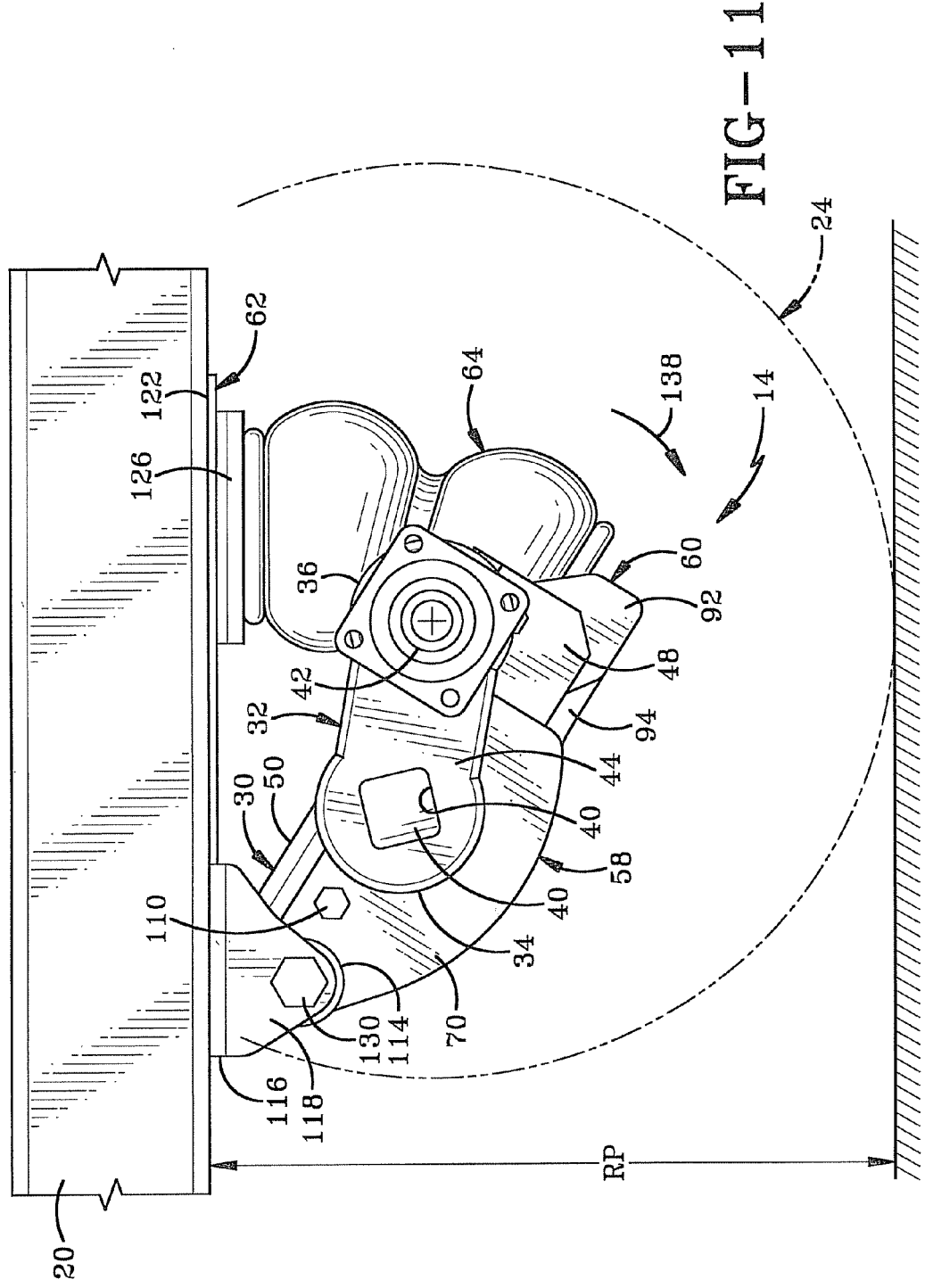
FIG. 11 is a left elevation view of the driver side of a preferred embodiment suspension system retrofit kit installed and in the rebound position; and, FIG. 12 is a left elevation view of the driver side of a preferred embodiment suspension system retrofit kit installed and in the jounce position.

FIG. 11 illustrates the vehicle suspension system in the rebound position and occurs as spindle 42 travels in the direction associated with arrow 138. Here, the total spindle travel available with the torsion axle at full load and spring 64 fully exhausted is approximately 6.96 inches in the preferred embodiment.

FIG. 12 illustrates the vehicle suspension system with no air in spring 64 and in the jounce position which occurs as spindle 42 travels in the direction associated with arrow 140. In this arrangement, the spindle jounce travel available with the torsion axle from full load to shock load is approximately 0.67 inches, while the total spindle travel from no load to shock load is approximately 1.95 inches. Thus it is seen that the retrofit suspension kit provides the additional dampening and suspension of an air spring or axial spring suspension system without the high up-front costs of a factory installation or the removal and replacement of the original torsion axle.

In summary, vehicle suspension system 14 includes an easily installed retrofit kit 22 that is installed around a trailing beam axle. The retrofit kit includes pivot arm 58 for pivotal connection with hanger bracket 62. Hanger bracket 62 is connected to support assembly 60 through spring 64. Thus, when spring 64 is expanded or contracted, support assembly 60 is pivoted at the pivotal connection between the hanger bracket, the pivot arm, and the support assembly. Further, installation of the retrofit kit assembly is accomplished by initially securing the pivot arm and support assembly to mounting bracket 30. Next, spring 64 is mounted to support assembly 60 and hanger bracket 62 is rotated downwards into contact with the top of spring 64.

Accordingly, the suspension system retrofit kit is an effective, safe, inexpensive, and efficient device that achieves all the enumerated objectives of the invention, provides for eliminating difficulties encountered with prior art devices, systems, and methods, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the suspension system retrofit kit is constructed and used, the characteristics of the construction, and the advantageous new and useful results obtained; the new and useful structures, devices, elements, arrangement, parts, and combinations are set forth in the appended claims.

What is claimed is:

1. A method of retrofitting an existing torsion axle suspension carried by a frame with an air spring comprising the steps of: removing an original torsion axle that was fixed to a frame from the frame; and mounting the torsion axle to at least one rotatable arm such that rotation of the arm causes vertical translation of the original torsion axle; attaching a support assembly to the torsion axle; attaching a hanger bracket to the frame; attaching a pivot arm to the hanger bracket and to the torsion bar whereby the existing torsion axle is carried by the pivot arm; and, installing an air spring intermediate the support assembly and the frame.

2. The method as defined in claim 1 comprising the further step of clamping at least one side of the support assembly to the torsion axle.

3. The method as defined in claim 2 in which the at least one side of the support assembly is clamped to the torsion axle intermediate a pair of torsion bar ends.

4. The method as defined in claim 3 comprising the further steps of:
   providing a support bracket with a clamp face complimentary shaped to a portion of the torsion axle;
   providing a clamp section shaped to contact the torsion axle; and
   attaching the clamp face to the clamp section with the torsion axle interposed therebetween.

5. The method as defined in claim 4 comprising the further step of attaching the support assembly to the pivot arm.

6. The method as defined in claim 3 comprising the further steps of:
- removing the original mounting brackets from the frame; and
- attaching at least one of the pivot arms and support assembly to the original mounting bracket.

7. The method as defined in claim 6 in which both the pivot arm and the support assembly are attached to the original bracket once it is removed.

8. The method as defined in claim 7 in which the pivot arm and the original bracket surround the torsion axle when installed.

9. The method as defined in claim 7 in which a spindle has an axis and the air spring is installed with the spindle axis passing therethrough.

10. The method as defined in claim 6 further comprising the step of drilling through holes in the mounting bracket.

11. The method as defined in claim 1 in which a portion of the support assembly is installed rearward of the torsion axle and a portion of the pivot arm is installed forward of the torsion axle whereby the torsion axle is located intermediate a portion of the pivot arm and a portion of the support assembly.

* * * * *